US010812331B1

(12) United States Patent
Satpathy et al.

(10) Patent No.: US 10,812,331 B1
(45) Date of Patent: Oct. 20, 2020

(54) NETWORK DEPLOYMENT ORCHESTRATION

(71) Applicant: T-Mobile USA, Inc., Bellevue, WA (US)

(72) Inventors: Suchit Satpathy, Hackettstown, NJ (US); Yun Lee, Stafford, TX (US); Florendo Atienza, Bellevue, WA (US); Venu Mudunuri, Carrollton, TX (US); Andrew Rogers, Mercer Island, WA (US); Senthil Ravindranath, Bothell, WA (US); Brian Barnhart, Parsippany, NJ (US); Jonathan Sarbillon Ramirez, Little Elm, TX (US); Robert Berrier, Renton, WA (US); Mohamed Youssef Mohamed Madian, Parsippany, NJ (US); Peter Bucko, Frisco, TX (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/389,787

(22) Filed: Apr. 19, 2019

(51) Int. Cl.
*H04L 12/24* (2006.01)
*H04W 84/04* (2009.01)

(52) U.S. Cl.
CPC ........ *H04L 41/082* (2013.01); *H04W 84/042* (2013.01)

(58) Field of Classification Search
None
See application file for complete search history.

(56) References Cited

U.S. PATENT DOCUMENTS

| 9,131,403 | B1* | 9/2015 | Courchesne | H04W 16/225 |
| 2009/0299788 | A1* | 12/2009 | Huber | H04W 8/20 |
| | | | | 455/456.3 |
| 2010/0027521 | A1* | 2/2010 | Huber | H04W 48/02 |
| | | | | 370/338 |
| 2013/0286851 | A1* | 10/2013 | Moser | H04W 88/10 |
| | | | | 370/241.1 |
| 2015/0049681 | A1* | 2/2015 | Huang | H04W 48/20 |
| | | | | 370/329 |
| 2015/0087321 | A1* | 3/2015 | Scherzer | H04W 16/18 |
| | | | | 455/446 |

(Continued)

OTHER PUBLICATIONS

Enabling Small Cell Deployment with HetNet, John Hoadley and Payam Maveddat—Taqua LLC (Year: 2012).*

Primary Examiner — Jamaal Henson
(74) Attorney, Agent, or Firm — Lee & Hayes, P.C.

(57) ABSTRACT

Processes and systems for automatically configuring small cells, microcells, picocells, and femtocells for deployment in a cellular network are described herein. The system uses an orchestrator in an Orchestration Platform to direct the generation of the configuration for network assets to be deployed. The Orchestration Platform interacts with components to generate the data and parameters necessary for the configuration. The Orchestration Platform directs system components to generate the configuration, validate the configuration, execute the configuration, and download the configuration. The processes and systems include a database to maintain the state of a system instance during the configuration process, allowing an orchestrator to start, suspend, abort, or restart its workflow process at any time without the loss of any work.

20 Claims, 13 Drawing Sheets

(56) References Cited

U.S. PATENT DOCUMENTS

| | | | |
|---|---|---|---|
| 2015/0092552 A1* | 4/2015 | Bajj | H04W 84/18 370/235 |
| 2015/0141027 A1* | 5/2015 | Tsui | H04W 24/02 455/452.1 |
| 2016/0157106 A1* | 6/2016 | Randall | H04W 16/18 455/446 |
| 2016/0192202 A1* | 6/2016 | Calin | H04W 24/02 455/446 |
| 2016/0353309 A1* | 12/2016 | Gunnarsson | H04W 72/085 |

* cited by examiner

CREATE A SITE INSTANCE IN AN ASSET DATABASE, THE SITE INSTANCE ASSOCIATED WITH AT LEAST ONE OR MORE SMALL CELLS TO BE DEPLOYED IN THE NETWORK, THE SITE INSTANCE INCLUDING AN IDENTIFICATION FIELD AND ONE OR MORE STATUS FIELDS, THE IDENTIFICATION FIELD IDENTIFYING THE AT LEAST ONE OR MORE SMALL CELLS TO BE DEPLOYED, THE ONE OR MORE STATUS FIELDS ARE ASSOCIATED WITH THE AT LEAST ONE OR MORE SMALL CELLS
1302

GENERATE INFORMATION ASSOCIATED WITH A CONFIGURATION OF THE AT LEAST ONE OR MORE SMALL CELLS TO BE DEPLOYED IN THE NETWORK, WHEREIN AT LEAST ONE OF THE ONE OR MORE STATUS FIELDS ASSOCIATED WITH THE AT LEAST ONE OF THE ONE OR MORE SMALL CELLS TO BE DEPLOYED ARE UPDATED TO INDICATE A SUCCESSFUL GENERATION OF THE INFORMATION ASSOCIATED WITH THE CONFIGURATION
1304

GENERATE A CONFIGURATION FILE FOR THE AT LEAST ONE OF THE ONE OR MORE SMALL CELLS, WHEREIN AT LEAST ONE OF THE ONE OR MORE STATUS FIELDS ASSOCIATED WITH THE AT LEAST ONE OF THE ONE OR MORE SMALL CELLS TO BE DEPLOYED ARE UPDATED TO INDICATE A SUCCESSFUL GENERATION OF THE CONFIGURATION FILE FOR THE AT LEAST ONE OF THE ONE OR MORE SMALL CELLS
1306

EXECUTE THE CONFIGURATION FILE, WHEREIN AT LEAST ONE OF THE ONE OR MORE STATUS FIELDS ASSOCIATED WITH THE AT LEAST ONE OF THE ONE OR MORE SMALL CELLS TO BE DEPLOYED ARE UPDATED TO INDICATE A SUCCESSFUL EXECUTION OF THE CONFIGURATION FILE
1308

FIG. 13

NETWORK DEPLOYMENT ORCHESTRATION

BACKGROUND

To meet the growing demand of demand for data and voice communication, network architectures of the wireless communication industry utilize a multitude of types of network assets. The coverage area for a network asset such as individual cells is expected to shrink in size in the future, encouraging cellular operators to favor the deployment of small cells, microcells, femtocells, and picocells, rather than macro cells. Additionally, connecting these small cells to the network may occur through a trusted or untrusted backhaul depending on the requirement and/or implementation. Accordingly, it is expected that a large number of small cells, many of which may have different configuration requirements, will be deployed in the future, creating logistical and technical issues during deployment.

Diverse consumer-specific small cell, microcell, picocell, and femtocell deployment creates challenges such as back haul issues in a customer's ISP, provisioning issues, and system synchronizing issues. These issues increase time and labor necessary to deploy the small cells. For example, deployment of small cells typically results in customer care calls and laborious troubleshooting. Making simple and automatic configuration and deployment of small cell assets may facilitate an operator or engineer to efficiently identify possible causes of the small cell device inactivation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 13 illustrates another example method for orchestrating the deployment of one or more small cells in a cellular network.

DETAILED DESCRIPTION

Figure 1:
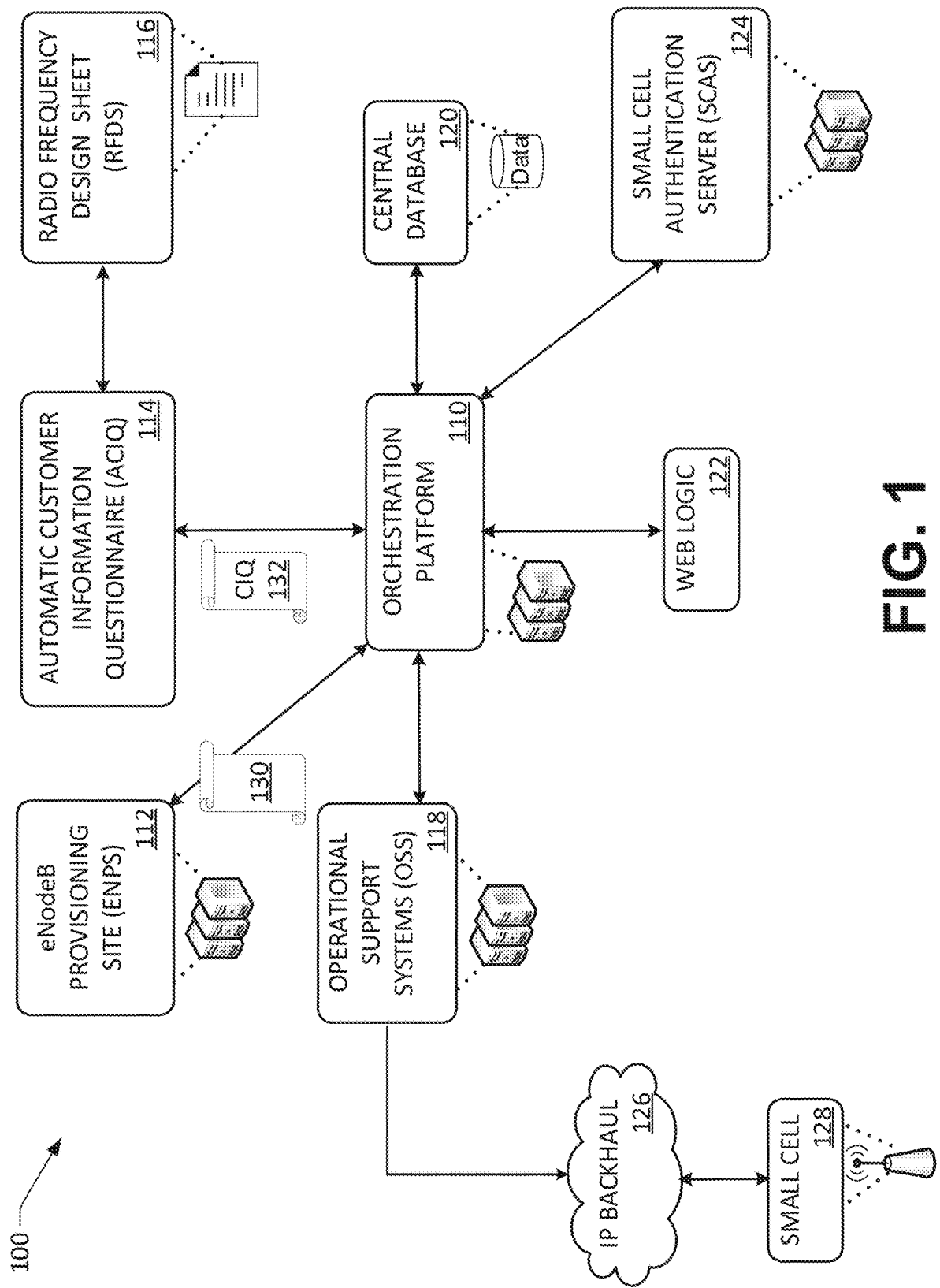
FIG. 1 is an illustrative environment depicting a system for orchestrating network deployment of small cells in a cellular network.

Described herein are systems and methods for automatic orchestration of network deployment of nodes, including small cells, and communication processes to facilitate the deployment of such nodes. The small cells may include picocells and femtocells. In an example, the communication processes include software interfaces for directing components to perform processes within the workflow for the configuration and deployment of network assets. In an example, the orchestration solution is robust and directs the communication, configuration, process flow, and deployment of network assets. The overall workflow process for the configuration and deployment of a small cell may identify and receive parameters and data to generate a configuration for a small cell, may generate the configuration for the small cell, and may dispatch the small cell into the network.

In an example, the systems and methods include an Orchestration Platform that includes an orchestrator for directing the operation of various components for the configuration and deployment of small cells in a network. The Orchestration Platform interfaces with an eNodeB Provisioning Server (ENPS) (in the case of 4G or LTE networks) or a gNodeB Provisioning Server (GNPS) (in the case of 5G networks) to generate a configuration for a small cell to be deployed in the network. Generating a configuration may include parameters and data obtained from a Customer Information Questionnaire (CIQ). A CIQ may be automatically generated by an Automatic Customer Information Questionnaire (ACIQ) tool. A CIQ may include a log of design parameters for the small cell. The CIQ may include data and parameters for the configuration generation of the small cell. In some examples, the parameters include frequency parameters for the small cell. The CIQ may obtain frequency parameters such as radio frequency data and parameters from a Radio Frequency Design Sheet (RFDS) tool. In an example, the RFDS tool provides a portion of the design criteria for the small cell to the ACIQ tool.

The system and methods may include an Operational Support System (OSS) that receives the configuration of the small cell to be deployed. The OSS may be coupled to the small cell to be deployed via an IP Backhaul. The IP Backhaul may be trusted or untrusted. The OSS may verify the configuration, and the OSS may execute the configuration. Once verified and executed, the OSS may transfer the configuration file to the small cell for deployment.

The system and methods may include a Small Cell Authentication Server (SCAS). The SCAS may generate a security certificate for the small cell. In an example, the security certificate may be generated when the small cell is connected to an untrusted public backhaul. The security certificate allows for a secure IP tunnel (IPSec) to be established between the small cell and the OSS via the IP Backhaul. In another example, the security certificate may be generated when the small cell is connected to a trusted backhaul. In an example, the security certificate may be generated by a security authorization server.

The Orchestration Platform may interface with web logic to provide a user interface for a user to input information to the system. In an example, the functionality of the web logic may be included with the Orchestration Platform. In an example, the functionality of the web logic may be included in another component of the system. The functionality of the web logic may be distributed across the Orchestration Platform and one or more components of the system.

In one example, the Orchestration Platform may interface with various network elements and platforms with Application Programming Interfaces (APIs). These APIs permit the development of a common network configuration and deployment tool that is accessible across different platforms. Using Application Program Interfaces (APIs) permits the creation of a general Orchestration Platform useful across numerous platforms.

In one example, the Orchestration Platform interfaces with one or more elements of the system. The Orchestration Platform may interface with the ACIQ tool to automatically generate a CIQ. The Orchestration Platform tool may also interface with the ENPS to provide the CIQ as input. The Orchestration Platform tool may direct the ENPS to generate a configuration for the small cell to be added to the system. The Orchestration Platform tool may direct the operation of the OSS, including the verification and execution of the configuration file. The Orchestration Platform may interface with and direct the activity of a SCAS to provide a security certificate for the small cell to be added. A security authorization server may update a status flag to indicate a security certificate for the small cell has been added.

The Orchestration Platform may interface with databases during the operation of the system and workflow methods. The databases may include information about the small cell to be deployed. The databases may include information about the current state of the configuration for a site list (e.g., small cell to be added) of elements to be added. The databases may include information that is specific to a network element to be added, including data and parameters for the specific element.

In one example, the orchestration process may include two phases. Initially the Orchestration Platform may generate a set of databases containing data elements associated with network elements of a system. The network elements may include system nodes (such as small cells) that are currently present in the network, and system nodes that are to be added to the network. The data creation includes identifying a network site that is to be added to a network, and then creating an instance for that data site in a set of databases. In an example, the set of databases may include one or more databases. The orchestration workflow of the Orchestration Platform directs the system to update to include an instance for new system node sites. Initially the instance for a proposed site is populated with default data, identifying the processes of the workflow for the automatic deployment and configuration that have not yet been completed.

Following database update, the orchestration workflow for the Orchestration Platform identifies the new sites to be added from the database. These new sites may be configured using data and parameters associated with the sites. The configuration of a site may thereafter be verified and executed to ensure successful integration of the new element (or site) into the network. The workflow process may obtain the current state of the configuration and deployment process by querying the appropriate fields in the database.

The Orchestrator Platform performs workflows and tasks for the configuration and deployment of a small cell. At the beginning of the workflow, the Orchestrator may identify all tasks to be performed as "Not Ready." Thereafter, the tasks labeled "Not Ready" may be identified and performed thereby allowing the workflow to be performed over time. Maintaining the state of the workflow allows the orchestrator to work on a particular task or function as appropriate during the configuration and deployment process.

The disclosed systems and methods include processes that direct and verify workflow processes during configuration and deployment. These processes provide internal operations and processes that confirm the correct functions and steps were executed and confirm that the functions and steps produced the correct or expected output. Errors and deviations from the expected workflow are identified and cataloged in the databases to provide a description of the state of the configuration and deployment processes and systems.

FIG. 1 depicts an example system 100 for configuring a small cell 128 in a cellular network. FIG. 1 illustrates a small cell 128 that is connected to an operational support system (OSS) 118 via an IP backhaul 126. The example system includes an Orchestration Platform 110 that is coupled to an eNobeB Provisioning Server (ENPS) 112, an automatic customer information questionnaire (ACIQ) tool 114, web logic 122, a central database 120, and a small cell authentication server (SCAS) 124. The ACIQ tool 114 is coupled to a radio frequency design sheet (RFDS) tool 116. The Orchestration Platform 110, in conjunction with the ENPS 112, ACIQ tool 114, RFDS tool 116, central database 120, OSS 118, web logic 122, and SCAS 124, function to automatically configure the small cell for deployment.

In one example, the Orchestration Platform 110 automatically configures a small cell 128 for deployment in a cellular network. The Orchestration Platform 110 includes functionality to direct and control the configuration of a small cell. The Orchestration Platform 110 may direct queries made to, or by, elements of the system. The Orchestration Platform 110 may be implemented in various embodiments, including as a virtual machine, as functionality on a server computer, in a stand-alone computer, or combinations thereof. The disclosed systems and methods are not limited by any particular hardware or software implementation of the Orchestration Platform 110. It is understood that the scope of the systems and methods does not require a specific implementation of the Orchestration Platform 110.

The Orchestration Platform 110 directs or controls various aspects or steps for configuring a small cell for deployment as discussed in this disclosure. In an example, the Orchestration Platform 110 may be implemented as Application Program Interfaces (APIs). The APIs may interface with other elements of the system to facilitate configuration of the small cell for deployment. The Orchestration Platform 110 may direct, control, and/or interface with one or more of the SCAS 124, ACIQ tool 114, central database 120, OSS 118, and web logic 122 through the APIs in one example.

The Orchestration Platform 110 communicates with an eNodeB Provisioning Server (ENPS) 112 as part of configuring the small cell 128 to be added to the cellular network. The ENPS 112 may produce a configuration file, based in part on the information received from the ACIQ tool 114. The configuration file for the small cell may be used by the Operation Support System (OSS) 118 to execute and validate a configuration model for the small cell. In an example, the ENPS 112 receives a customer information questionnaire (CIQ) 132 from the ACIQ tool 114 via the Orchestration Platform 110. The CIQ is used to integrate the new small cell site into the cellular network. A valid CIQ may be automatically generated by ACIQ tool 114 via Orchestration Platform 110. In the case of a 5G network, the eNodeB Provisioning Sever may be replaced with a gNodeB Provisioning Server (GNPS). It is to be understood that the disclosed systems and methods are not limited to current cellular systems such as 4G, LTE, and 5G, but the Provisioning Server may be updated along with the underlying cellular network technology.

In an example, the CIQ includes configuration data used to build the small cell site for the cellular network. The CIQ may include information relating to various aspects of the small cell, including information related to which Mobility Management Entity (MME) server to communicate with, additional network elements, identification of parameters for connectivity to the small cell, and data related to the physical connectivity of the small cell. The structure and contents of the CIQ 132 may be dependent on the entity supplying the CIQ 132.

The Orchestration Platform 110 may direct the automatic generation of a CIQ file via the ACIQ tool 114. In one example, the Orchestration Platform 110 selects a CIQ 132 with an identifier that identifies a small cell to be deployed in the cellular network such as a site identification string. In this example, the Orchestration Platform 110 may query a central database 120 using the site identification string to obtain an associated record in the CIQ 132. In an example, the Orchestration Platform 110 may direct the production or generation of the CIQ 132 through the ACIQ tool 114 as discussed below. After obtaining the CIQ 132, the Orchestration Platform 110 may direct the ENPS 112 to generate a configuration file, using the ACIQ information and other information related to the small cell to be deployed. A configuration file 130 is generated and downloaded to the OSS 118 via the Orchestration Platform 110 to integrate the small cell site in the OSS 118. In an example, the configuration file 130 may be downloaded to Orchestration Platform for access by the OSS 118.

FIG. 1 depicts an Automatic Customer Information Questionnaire (ACIQ) tool 114. As discussed above, the ACIQ may be initiated by the Orchestration Platform 110. The ACIQ tool 114 produces, among others, the CIQ 132 for a new site. The ACIQ tool 114 interfaces with the RFDS tool 116 to gather information for the automatic generation of the CIQ. In an example, the ACIQ tool 114 receives at least three parameters: (1) a Site ID, (2) RFDS Layout Name, and (3) RFDS Build Type when generating a CIQ file. In an example, the Site ID may be a string identifying the small cell to be configured for deployment. In an example, the RFDS Layout Name may be a string identifying the radio frequency information for the small cell to be configured for deployment. In an example, the RFDS Build Type identifies the specific type of RFDS build. The RFDS Build Type may be represented by an integer; for example, 1 represents a main build, 2 represents an interim build, and 3 represents a preliminary build of the RFDS tool 116. Of course, the ACIQ tool 114 may receive other information and is not limited to the examples discussed herein.

The Radio Frequency Design Sheet (RFDS) tool 116 may obtain information related to the radio frequency configuration of the small cell 128. Example data obtained by the RFDS tool may include the frequency used by the small cell, where the small cell site is located, and other parameters used by the small cell. The ACIQ tool 114 may query the RFDS tool 116 to obtain data for generating a CIQ 132. The ACIQ tool 114 may interface with the RFDS tool 116 to automatically generate the CIQ 132. The CIQ 132 may be in the form of a file.

After the ACIQ tool 114 generates the CIQ 132, the ENPS 112 receives the CIQ 132 to produce a configuration file to be communicated to the Operational Support System (OSS) 118. In an example, the ENPS 112 may generate the configuration file, based in part on the RFDS information. In an example, the configuration file includes data, parameters, and structures that describe or define, the configuration of the small cell to be deployed. In an example, the ENPS 112 generates the configuration file and other configuration models for the small cell.

FIG. 1 includes an Operational Support System (OSS) 118. In one example, the OSS 118 monitors, controls, analyzes, and/or manages services on its network. The OSS 118 may validate the configuration of a small cell 128 to be deployed on the network. One method of validating the configuration is comparing the configuration file against a known model to determine whether the parameters and values fall within acceptable tolerances. The OSS 118 may be implemented as software in a server computer system. The OSS 118 may also be implemented as software in other types of processing hardware known to one of ordinary skill in the art. The OSS 118 may use the configuration, alone or in combination with one or more configuration models, to build the site relating to the small cell to be employed in the cell network.

The central database 120 in FIG. 1 may include databases and tables for use by the Orchestration Platform 110 during configuration of a small cell 128 for deployment. In an example, the central database 120 may include an asset database, an element table, and a master table. The element table includes a listing of any hardware or known (such as a small cell) to be deployed in a cellular network. A new hardware or node being deployed may be stored in an element table included in a national data warehouse. An element database stores key parameters and element IDs for the small cells to be configured. The asset database may be a database created for the Orchestration Platform 110. The asset database may store assets, which are information needed or relied upon by the Orchestration Platform 110. The information may relate to small cells to be deployed.

The asset database may synchronize with the element database to receive parameters for its operation. The asset database may also generate and populate additional parameters based, in part, on the workflow execution and associated results. In an example, the asset database of the Orchestration Platform 110 includes a master table and/or an element table. The master table may include information to be used by the Orchestration Platform. The Orchestration Platform 110 may update the master table with the results of its operations and workflow (such as the state and decision of each work flow component).

In an example, the central database 120 may include an asset database. In an example, the central database 120 may include an element table. In an example, the central database may include a master table. In an example, the asset database may include a combination of the element table and a master table.

The asset database may include tables for storing entries related to errors that occur during configuration of the small cell. The asset database may also include tables for storing entries related to further operations to be performed during the configuration. These tables may store the state of the configuration workflow system so that the configuration operation may occur in states by allowing the configuration workflow to be stopped and restarted at various points during workflow process. Once restarted or restored, the Orchestration Platform 110 may query the asset database to determine the current state of the system. The current state of the system provides information to the Orchestration Platform 110 to identify processes in the workflow that have been completed and thus do not need to be repeated. The asset database may also include information for determining or performing operations at a future time. Performing operations at a future time enables the Orchestration Platform 110 to restart or perform operations in the workflow at a known time allowing the system to obtain information that maybe needed for the configuration workflow. By storing the state of the system, the Orchestration Platform 110 may efficiently schedule the automated process.

The master table may include information such as SITE NAME, SITE TRANSPORT STATUS, SCAS STATUS, ACIQ STATUS, ENPS STATUS, OSS STATUS, and/or OPERATIONAL STATUS. The SITE NAME refers to the name or identification of the small cell to be configured for deployment. The SITE TRANSPORT STATUS refers to the state of the transport quality of the network regarding the network's ability to transport data. As discussed below, the SCAS STATUS refers to the state of the authentication and whether a valid security certificate has been created for the small cell. In an example, the SCAS STATUS is a status field associated with a security authorization server. The ACIQ STATUS refers to the state of the ACIQ tool regarding the automatic creation of the CIQ. ENPS STATUS refers to the state of the ENPS in producing a configuration file from ACIQ information. OSS STATUS refers to the state of the OSS 118. OPERATIONAL STATUS refers to the status of the configuration and deployment of a small cell.

The master table may include additional status information. The entries in the various status fields in the master table will be explained below with respect to the work flow diagrams shown in FIGS. 6-12. In addition to the master table, individual tables for each component (i.e., ELEMENT, ACIQ, TRANSPORT, ENPS, and OSS) may also be created. Each of these tables may include columns, such as SITE NAME, ACTIVITY, and DATE, to keep track of the progress and time required for each activity of the respective components. By recording the progress and the time to completion for each activity of the configuration workflow, the Orchestration Platform 110 may partially configure small cells for deployment. In an example, one or more APIs may be used to query and modify data elements maintained by third party applications allowing the configuration information to be accessed from multiple sources. In an example, the one or more APIs may be used to query and modify data elements maintained by the Orchestration Platform 110.

By maintaining the state of the configuration, the Orchestration Platform 110 may schedule tasks to occur at certain times. In an example, the Orchestration Platform 110 may determine that a transport query should occur in 5 days. In this case, the Orchestration Platform 110 may check the TRANSPORT status to determine if network connection is ready for deployment. Orchestration Platform 110 may mark the transport status as "pending" in the master table, and mark in other status tables that a transport follow-up is required for this small cell upon the expiration of 5 days. Accordingly, on the fifth day, the Orchestration Platform 110 would perform the follow-up operation based upon the states stored in the asset database. Other similar retry or repetitive functions may be implemented using additional tables in the asset database.

In an example, the Orchestration Platform 110 collects information from element database to generate a site instance in the master table. A site instance represents a network element to be added to the element database. The network element corresponds to a small cell to be deployed in the network. The site instances in the database, collectively, in part or in whole, define a site list. In one example, a site list is a list of network elements newly added to the element database and corresponds to future small cells to be deployed in the network. The site list includes data points associated with the network elements. In an example, the site list does not include a complete configuration file. In an example, the site list may include a complete configuration file. The Orchestration Platform 110 uses the data in the site list, in combination with configuration data, to deploy the small cells in the network.

The Orchestration Platform 110 may include interfaces allowing a user to input information into the system. FIG. 1 also depicts web logic 122. Web logic 122 may be a user interface coupled to the Orchestration Platform 110. In one example, the central database 120 may be connected to a web portal for users to provide input. Example input may include a query to be made during the operation of the Orchestration Platform. Example input may include modifying parameters to be used during operation of the Orchestration Platform 110. Other input may include data or parameters to be used during the configuration process. The web logic 122 allows a user to input data thereby permitting modification of parameters associated with the configuration and/or deployment of a small cell 128.

A small cell authentication server (SCAS) 124 is also depicted in FIG. 1. The SCAS 124 validates a security certificate for the small cell and provides the certificate to the cellular network. The security certificate allows the cellular network to establish a IPSec tunnel with the small cell to be deployed in the network. In an example, the SCAS 124 may be an Ericsson Global IT services (EGIS) server.

FIG. 1 also depicts a small cell 128 to be deployed in the cellular network. The small cell 128 may be any type of small cell, including a microcell, picocell, and femtocell. The small cell 128 may be coupled to the OSS 118 via an IP Backhaul 126.

Figure 2:
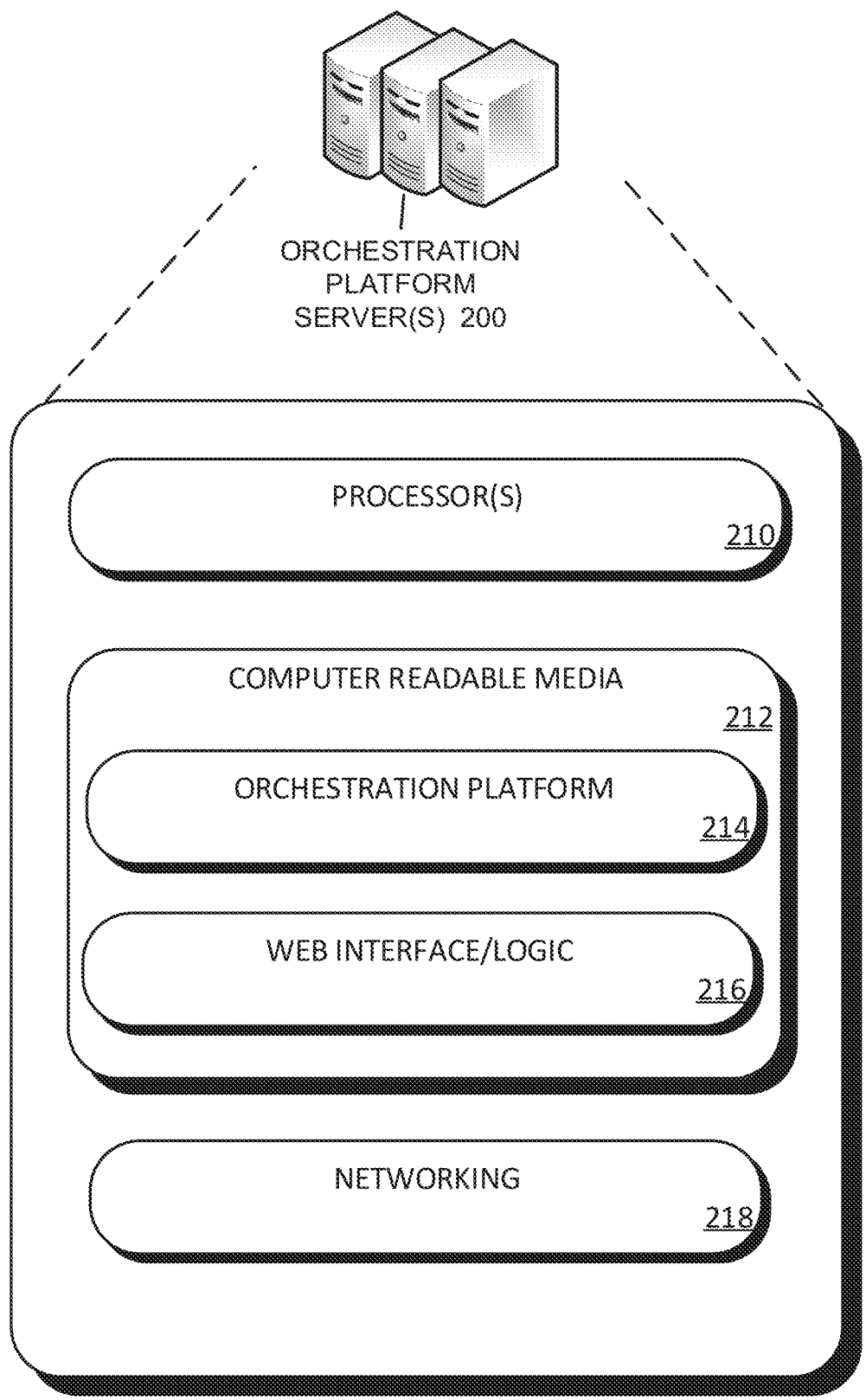
FIG. 2 illustrates some of the hardware and software functionality for an example orchestration server.

FIG. 2 depicts example hardware and software of an Orchestration Platform Server 200. The Orchestration Platform Server 200 includes one or more processors 210 and a computer readable media 212. The computer readable media 212 includes instructions that when executed by one or more processors performs the functions of the Orchestration Platform 214 for orchestrating the configuration and deployment of a small cell. The computer readable media also includes instructions that when executed by one or more processors performs the functions of a web interface 216.

Example computer readable media 212 include RAM, ROM, firmware, flash memory, EEPROM, or other types of memory storage known to one of ordinary skill in the art. Tangible computer-readable media may include volatile and nonvolatile, removable and non-removable media implemented in any method or technology for storage of information, such as computer readable instructions, data structures, program components, or other data. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 210 of the orchestration server(s). Any such tangible computer-readable media can be part of the orchestration platform server 200. In an example, computer readable media provides local storage for the configuration, log files, data, and/or parameters for the configuration and/or deployment of a small cell.

The orchestration platform server 200 may include networking component 218 for providing ports and components for communicating with the other elements of the system such as that should in FIG. 1. The networking component 218 includes transceiver ports for local area networks (LANs) and wide area networks (WANs). In one example, the LAN and/or WAN ports provide a wired connection to and Intranet and/or Internet. The networking component 218 may also include a wireless communications component that includes one or more wireless transceivers. For example, the transceivers can include a network interface card (NIC), a network adapter, a LAN adapter, or a physical, virtual, or logical address to connect to various network(s), or to the orchestration platform server 200, for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

As discussed previously, the Orchestration Platform 214 interfaces with, and controls, an ENPS 112, ACIQ tool 114, RFDS tool 116, OSS 118, Central Database 120, Web Logic 122, SCAS 124, and small cell 128 when orchestrating the configuration of a small cell in a cellular network. The functions of these elements were discussed previously with respect to FIG. 1.

Figure 3:
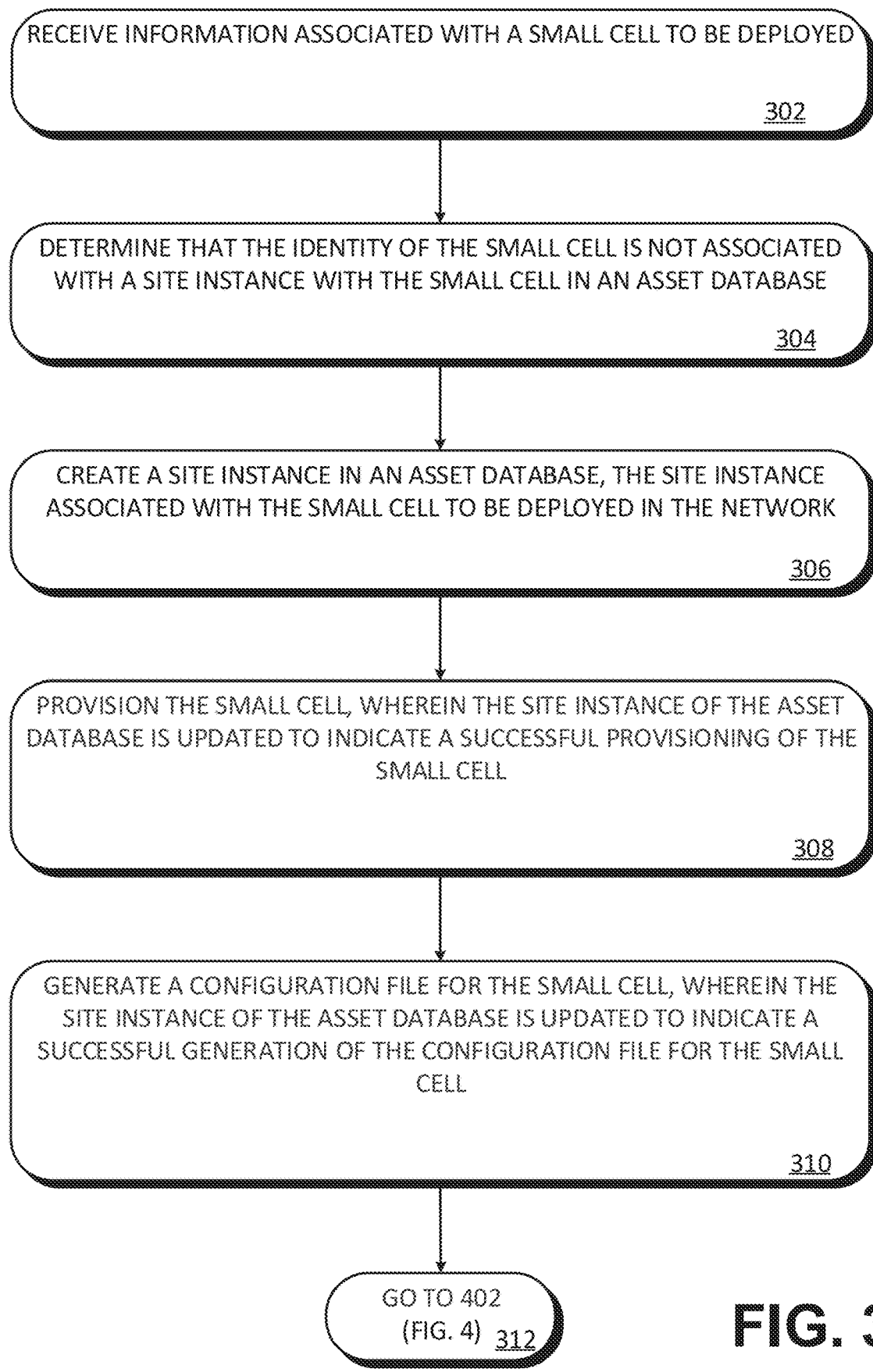
FIG. 3 illustrates an example method for orchestrating the deployment of one or more small cells in a cellular network.
Figure 4:
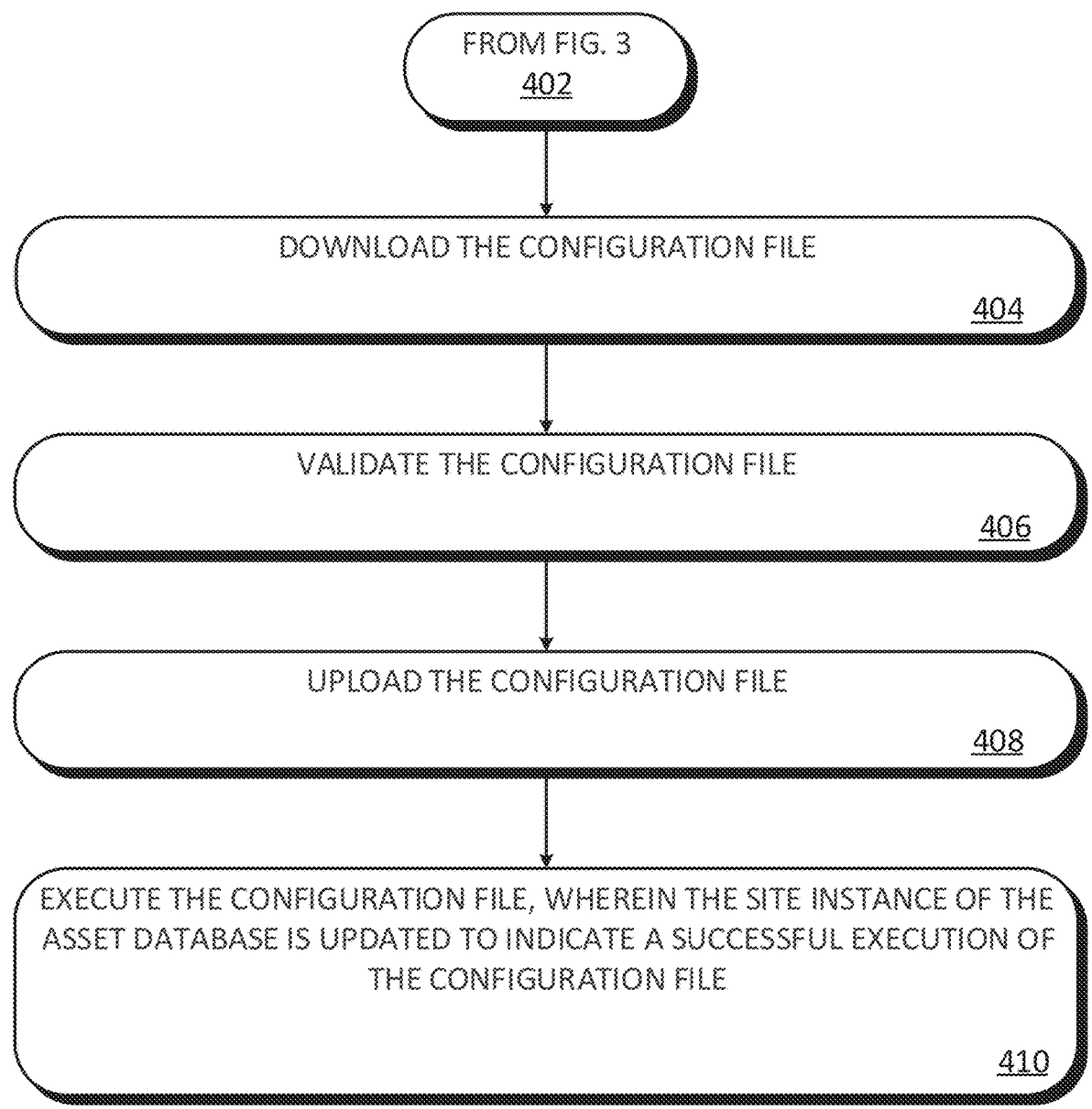
FIG. 4 illustrates another example method for orchestrating the deployment of one or more small cells in a cellular network.

FIGS. 3 and 4 depict example methods for configuring a small cell for deployment in a cellular network according to the disclosed systems and methods. The method shown in FIGS. 3 and 4 begins by receiving information associated with at least one small cell to be deployed at block 302. The information may identify the small cell to be deployed. The information may be included in an element database (discussed previously). In an example, the information may be received by the Orchestration Platform. In another example, the information may be received by the eNodeB or the OSS.

Upon receiving the information, the system and methods determines whether the received information of the small cell is associated with a site instance (block 304). The site instance may be stored in an asset database of the Orchestration Platform. In an example, the information received relates to the identification of the small cell to be configured for deployment. After determining, based at least in part on information related to the identification of the small cell, that the small cell is not associated with a site instance stored in the asset database, the Orchestration Platform prepares to generate an associated site instance in the asset database. In another example, another component of the system determines whether the received information is associated with a site instance in the asset database.

After determining that the small cell is not associated with an instance, the Orchestration Platform generates an instance of the small cell in the asset database (block 306). In this case, the generated site instance relates to one or more small cells to be configured for deployment in the network.

After generating an instance of the small cell in the asset database, the small cell to be deployed is provisioned (block 308). The provisioning may include the automatic generation of the CIQ by the ACIQ tool. As discussed previously, the ACIQ tool may access the REDS to obtain information for configuration. As part of the provisioning, the site instance is updated in the asset database to indicate a successful provisioning of the at least one of the one or more small cells.

The Orchestration Platform, thereafter generates a configuration file for the one of the one or more small cells to be deployed. The site instance of the asset database may be updated to indicate a successful generation of the configuration file for the one of the one or more small cells (block 310). The output of block 310 is the input to block 312. Block 312 is used as an input to block 402.

After generating a configuration file, the system downloads the configuration file (block 404). In an example, the site instance is updated to indicate a successful download. In one example, the configuration file is downloaded to the Orchestration Platform. After downloading the configuration file, the configuration file may be validated (block 406). In an example, the site instance is updated to indicate a successful validation. In an example, after receiving the configuration file, the Orchestration Platform validates the configuration file at block 406. The configuration file is uploaded for execution. In one example, the configuration file is uploaded to the OSS at block 408, and the configuration file is executed by the OSS at block 410. If the execution is successful, the site instance of the asset database is updated to indicate a successful execution of the configuration file in the OSS.

Figure 5:
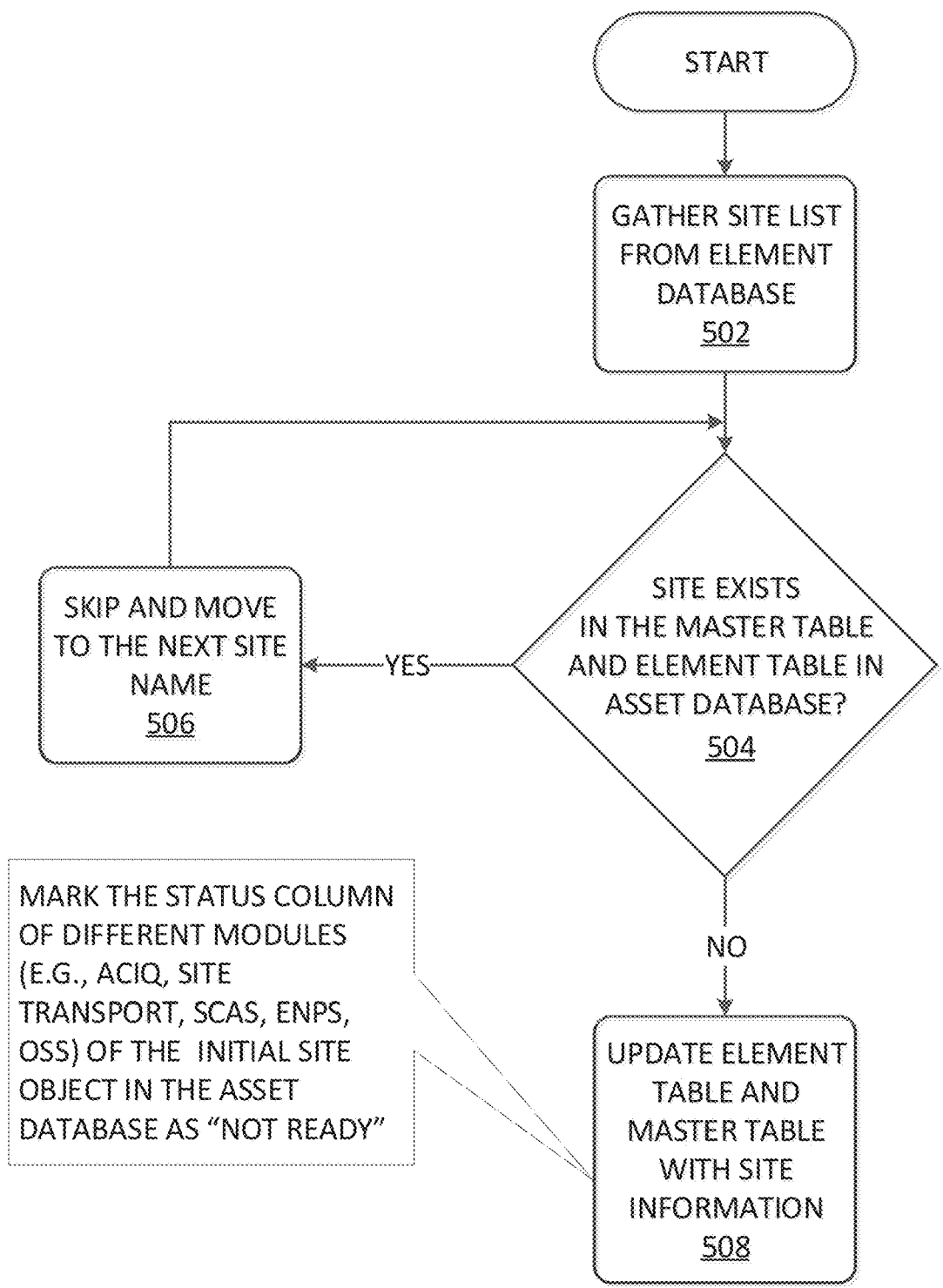
FIG. 5 illustrates an example method for creating table data for use in a method for orchestrating deployment of small cells in a cellular network. The tables may include a master table and an element table.

As discussed previously, in one example, configuration of a small cell for deployment includes creation of table data followed by generation of a configuration of the small cell for deployment. FIG. 5 depicts an example flow diagram for table data creation for a small cell to be added to a network. The flow diagram of FIG. 5 begins by obtaining or gathering a site list of small cells to be added to the network at block 502. The Orchestration Platform queries the element database, which stores information about the small cell to be added. The element database may be stored in a local or remote database. In an example, the element database may be stored in a national database. Upon obtaining information from the element database, the Orchestration Platform determines at block 504, whether the master table and element table in the asset database includes an entry corresponding to the small cell to be added. In one example, this determination is made based in part on the small cell identification. If an entry for the small cell exists in the asset database, the Orchestration Platform skips that site as no new entry needs to be made in the database. The Orchestration Platform thereafter obtains information about the next site name at block 506. Otherwise, if the site name is determined to not exist in the asset database, an entry is added to the element table and master table for the new site at block 508.

In one example, the element table may be updated by marking the status column for the small cell. For example, the status columns of each component (such as ACIQ, site transport, SCAS, ENPS, OSS) of the initial site object in the asset database may be initially marked as "Not Ready." As a component is used during the workflow, the respective status may be changed from "Not Ready" to "Successful." In an example, one or more of the status entries may be accompanied by a timestamp to maintain a time record of the state of the workflow. The status entries may be maintained in the element table, the master table, other tables of the asset database, other tables of other databases, or combinations thereof.

After the asset database is updated with the new site list, the Orchestration Platform may begin the workflow to configure the additional small cell for deployment.

Example workflows are shown in FIGS. 6-11. A feature of the workflow is to query the state of the configuration of the small cell to be deployed to determine where in the workflow process to begin. The states of the configuration may be updated during the workflow, creating an efficient process allowing the workflow process to pause and restart at a later time.

Figure 6:
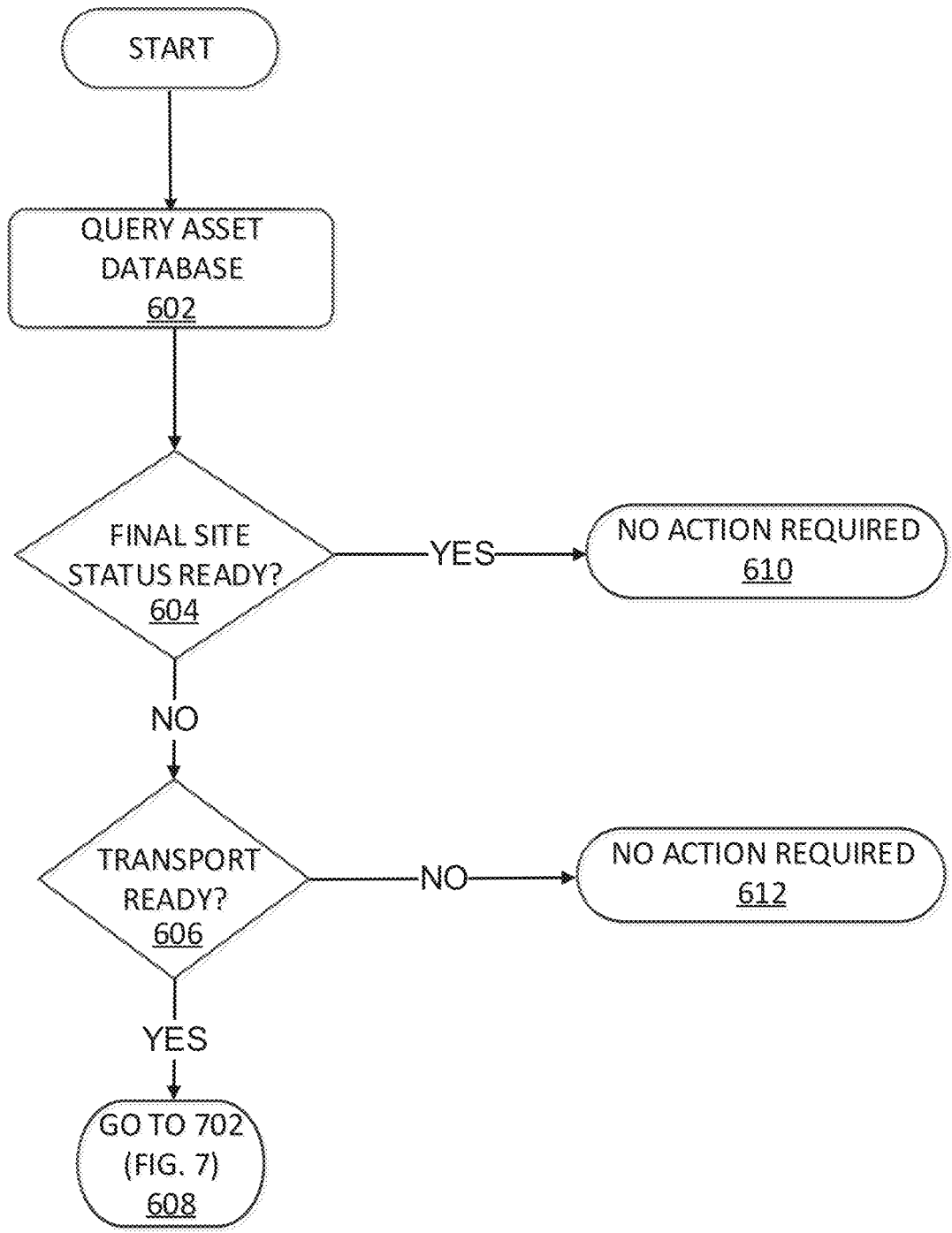
FIG. 6 illustrates another example method for orchestrating the deployment of small cells in a cellular network. The method depicted in FIG. 6 queries an asset database to determine if the small cells included in a site are ready for transport. The output of the process shown in FIG. 6 may be used as an input to the process depicted in FIG. 7.

FIG. 6 depicts some of the initial actions taken by the Orchestration Platform when configuring a small cell for deployment. The steps in FIG. 6 relate generally to determining the readiness of the small cell is ready for deployment and readiness of the network for transporting data. The workflow depicted in FIG. 6 begins at block 602 by querying the FINAL SITE status for the small cell in the asset database. If the FINAL SITE status is marked "READY" at block 604, then the Orchestration Platform performs no action as depicted by block 610. Otherwise, the TRANSPORT status is queried in the asset database for the small cell to be deployed at block 606 to determine that the network connectivity is acceptable or adequate to transport data. If the TRANSPORT status is determined to be not "READY" at block 606, the Orchestration Platform performs no action as depicted by block 612. In this case, the Orchestration Platform need not perform further steps until the network is ready to transport data. Otherwise, if the TRANSPORT status is determined to be "READY," the workflow proceeds to block 608 of FIG. 7 for the Orchestration Platform to analyze additional status parameters.

Figure 7:
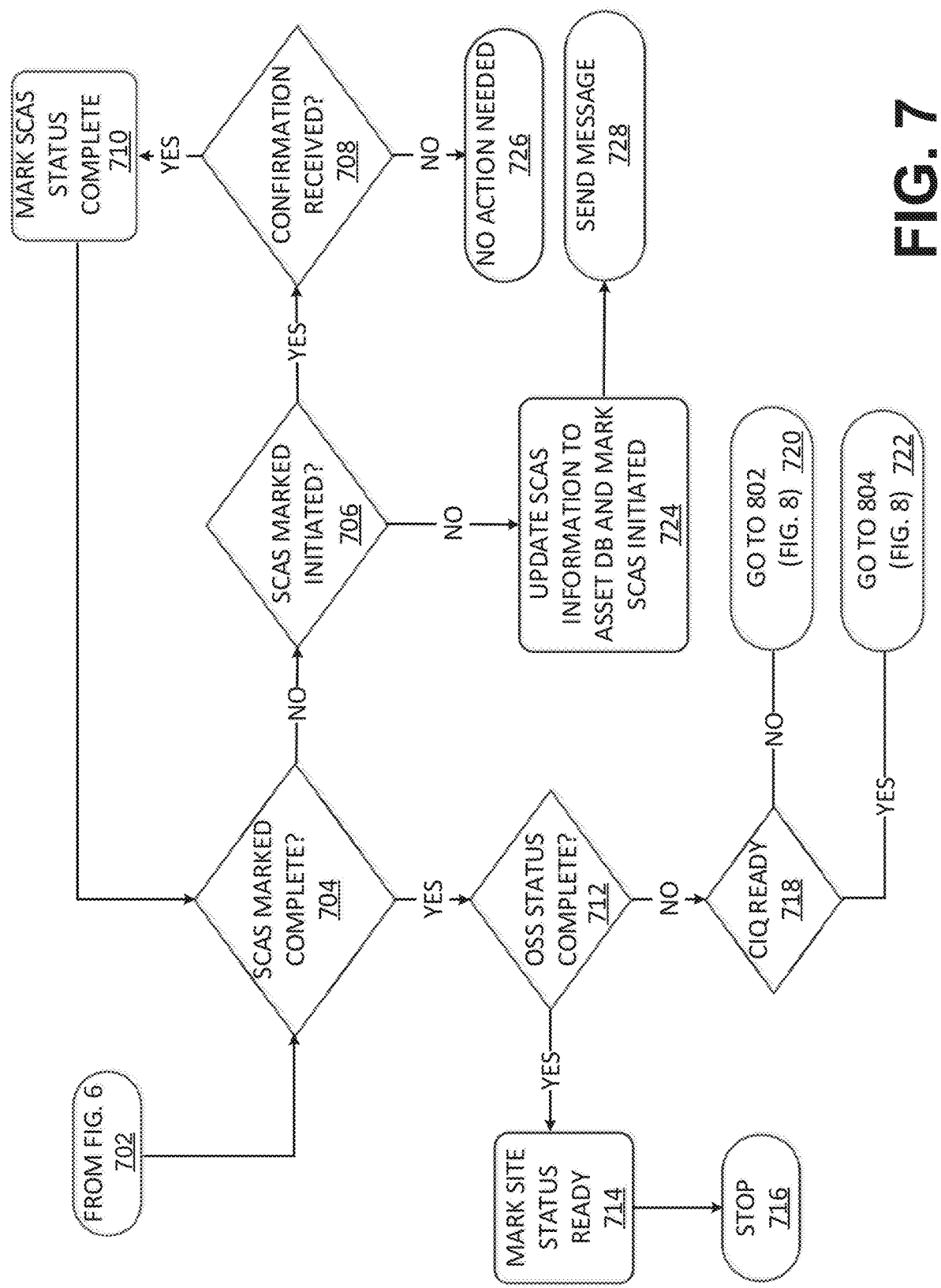
FIG. 7 illustrates another method for orchestrating the deployment of small cells in a cellular network. The method of FIG. 7 determines whether the small cells to be configured for deployment have been authenticated. If the small cells have not been authenticated, a message is sent to a database to obtain the authentication information. The method of FIG. 7 also determines whether an Operational Support System (OSS) is complete for the small cells, and if not, the output of the process shown in FIG. 7 may be used as an input to the process depicted in FIG. 8 based on the status of an associated Customer Inquiry Questionnaire (CIQ).

Thereafter, the workflow process analyzes the status of the SCAS, OSS, and CIQ as shown by the example depicted in FIG. 7. The output of FIG. 6 (block 608) is used as the input to FIG. 7 (block 702). The workflow depicted in FIG. 7 begins by querying the SCAS status at block 704 to determine the security status of the small cell. If the SCAS status is not marked as "COMPLETE," then the small cell has not received a security authentication certificate. After determining that the status of the SCAS has not been marked as "COMPLETE," the workflow process determines if the security authentication process of the SCAS has been initiated. This is done by querying the SCAS status to determine if the SCAS status has been marked as "INTIATED," at block 706. If the SCAS status is marked "INITIATED," the workflow process proceeds to determine whether a confirmation for the security authentication certificate was received at block 708. If no confirmation was received at block 708, no action is performed at block 726 as the workflow directs the system to wait for a confirmation before proceeding. Otherwise, if a confirmation was determined to be received at block 708, the SCAS status is marked as "COMPLETE" at block 710 and control passes back to block 704.

Turning back to block 706, if the status of the SCAS was determined to not be "INITIATED," the SCAS information is updated in the Asset database and the status of SCAS is marked as "INITIATED" at block 724. Thereafter, a message is sent to the SCAS provider to provide a security certificate at block 728 and to request confirmation of the authentication criteria to be received by the Orchestration Platform.

If the status of the SCAS is marked as "COMPLETE" at block 704, the small cell may be authenticated by the network and the process may continue. Thereafter, the OSS status is queried at block 712. If the OSS status is determined to be "COMPLETE," the SITE status is marked as "READY" at block 714, and the workflow stops at block 716. Otherwise, if the OSS status is not marked "COMPLETE" at block 712, then the workflow determines the step to be performed by the Orchestration Platform. For example, the status of the CIQ is queried to determine if the CIQ is "READY" at block 718. If the CIQ status is determined to be "READY," control passes at block 722 to block 804 of FIG. 8 for ACIQ component execution. If the CIQ status is not determined to be "READY," control passes at block 720 to block 802 of FIG. 8 for ACIQ component execution.

Figure 8:
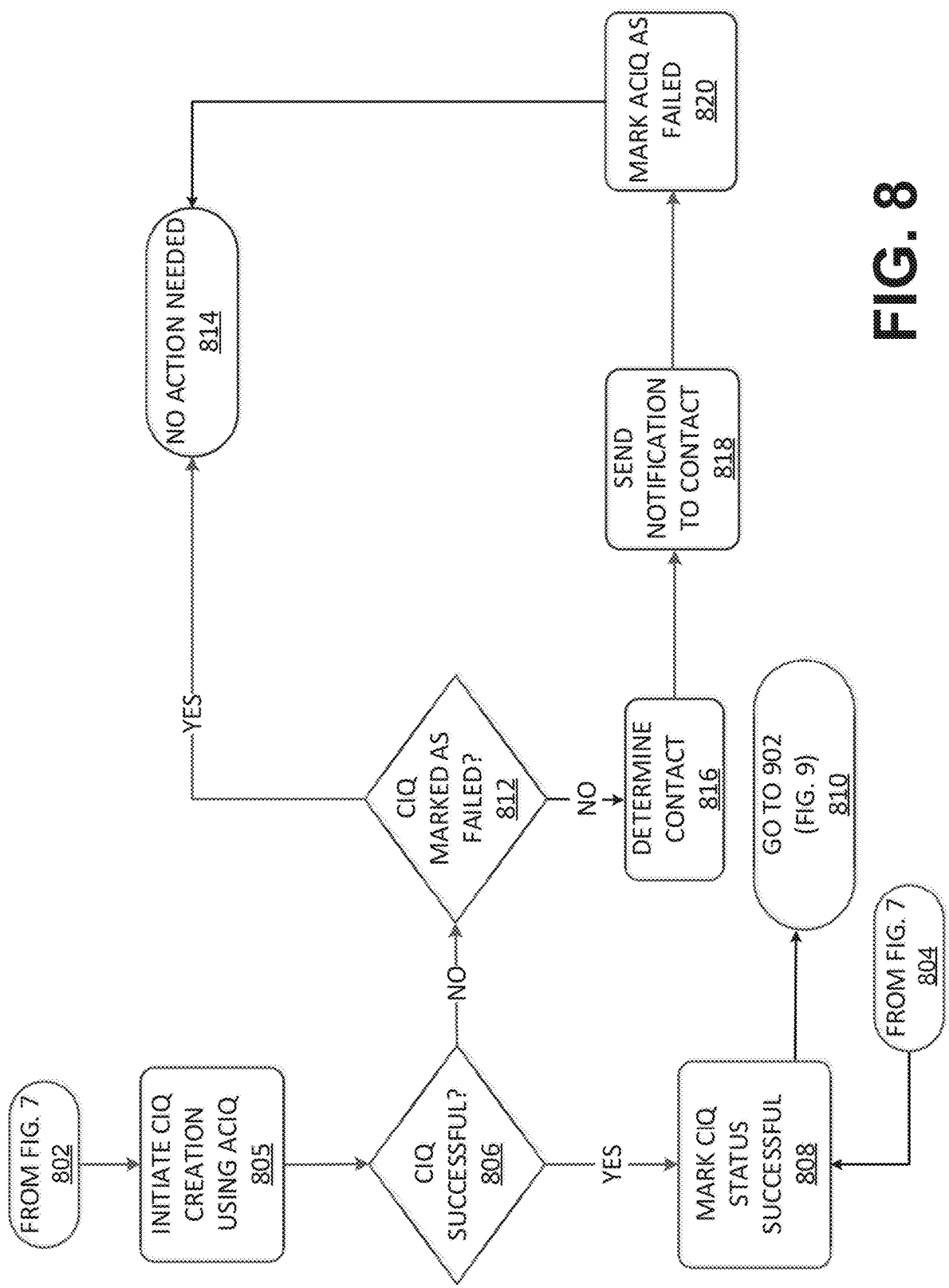
FIG. 8 illustrates a method to automatically create a CIQ. If the creation of the CIQ failed, the method identifies a contact to notify to successfully create a CIQ. The output of the process of FIG. 8 is used as an input to the process of FIG. 9.

FIG. 8 depicts a workflow to automatically determine the CIQ by the ACIQ component. If the CIQ status is "READY" (e.g., as determined in FIG. 7), the output from block 722 of FIG. 7 is used as input to block 804 of FIG. 8, and control passes from block 804 to block 808. At block 808 the status of CIQ is marked as "SUCCESSFUL," and control passes from block 808 to block 902 of FIG. 9. On the other hand, if the CIQ status is "NOT READY" (e.g., as determined in FIG. 7), the output from block 702 of FIG. 7 is used as input to block 802 of FIG. 8, and control passes from block 802 to block 805. At block 805, the ACIQ component initiates the automatic creation of CIQ. If the CIQ was successfully created or generated, the status of CIQ is marked as "SUCCESSFUL," and control is passed from block 810 to block 902 of FIG. 9.

FIG. 8 also depicts the functions related to the CIQ component. If the CIQ is determined to not be "SUCCESSFUL" at block 806, the workflow process shown in FIG. 9 includes additional functions to facilitate ACIQ generation. In this case, if the CIQ status is determined to be "FAILED" in block 812, control passes to block 814 where no action is required. Otherwise, if the CIQ is not marked as "FAILED" at block 812, the Orchestration Platform should obtain information from a contact site to generate the CIQ. In this case a contact is determined at block 816, and notification is sent to that contact at block 818 to obtain the CIQ information. Because the CIQ is marked as "FAILED," the "ACIQ" is also marked as "FAILED" at block 820. Thereafter, control is passed to block 814, where no action is required.

Figure 9:
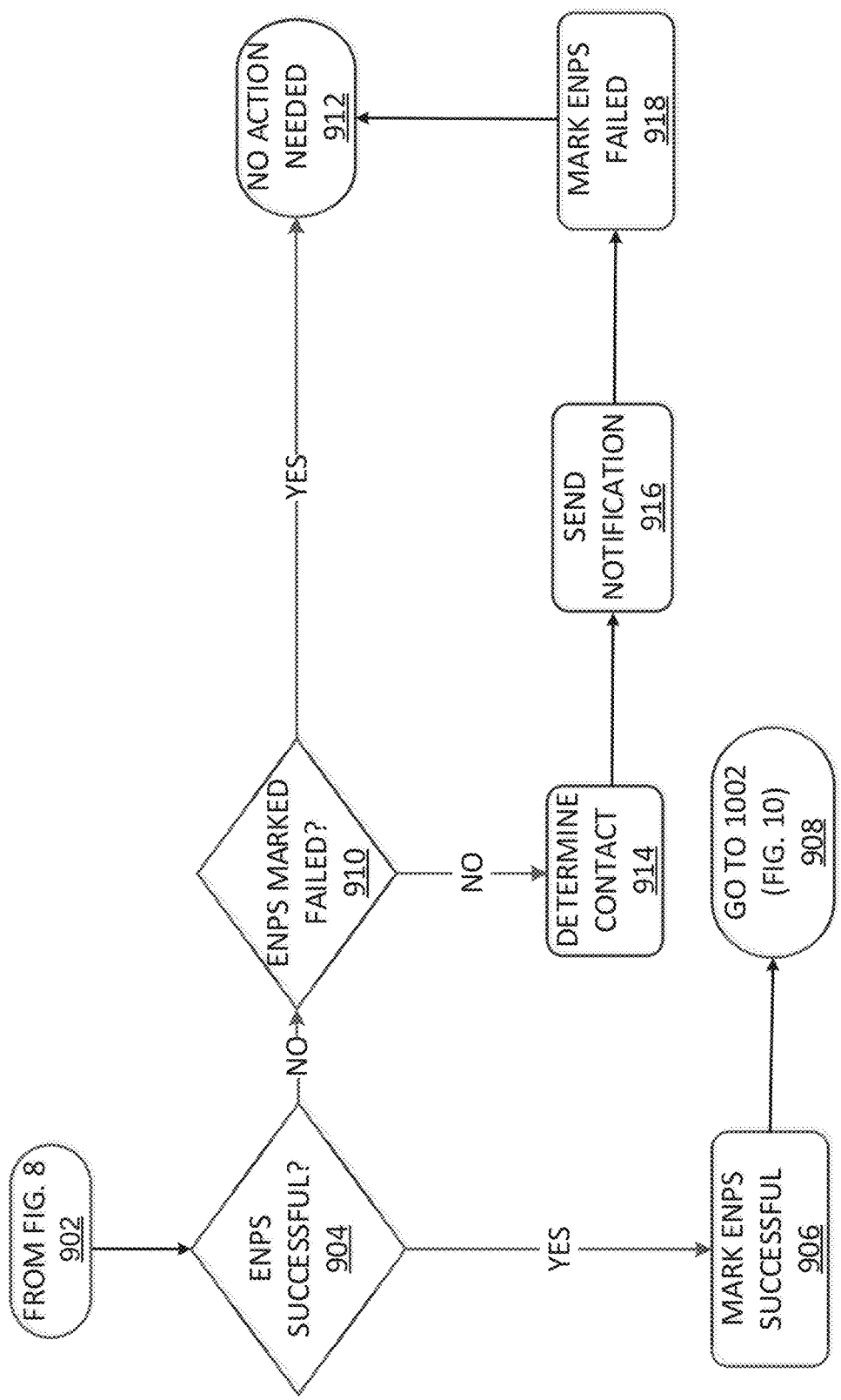
FIG. 9 illustrates a method of determining whether an eNodeB Provisioning Server (ENPS) is successful. If the ENPS is not successful, a contact is identified and notified to facilitate successful completion of the ENPS. The output of the process of FIG. 9 is used as an input to the process of FIG. 10.

FIG. 9 depicts the workflow process for determining whether the ENPS has created a configuration file for the small cell. The output of block 810 of FIG. 8 is used as input to block 902 of FIG. 9. Control passes to block 904 to determine if the ENPS was successful and generated a configuration file. If ENPS is "SUCCESSFUL" at block 904, control is passes to block 906, where the status of ENPS is marked as successful at block 906. Otherwise, if ENPS is not successful at block 904, control is passed to block 910 to determine if ENPS is marked as "FAILED." If the ENPS is determined to be marked "FAILED" at block 910, no configuration file has been generated and control is passes to block 912, where no action is required. Otherwise, if the ENPS is not determined to be marked as "FAILED," control passes to block 914 to determine a contact for the ENPS. Thereafter, a notification is transmitted to the contact at block 916 and the ENPS is marked as "FAILED" at block 918. Control is then passes to block 912 where no action is required. Accordingly, the actions depicted in FIG. 9 relate to the successful generation of a configuration file by the ENPS.

Figure 10:
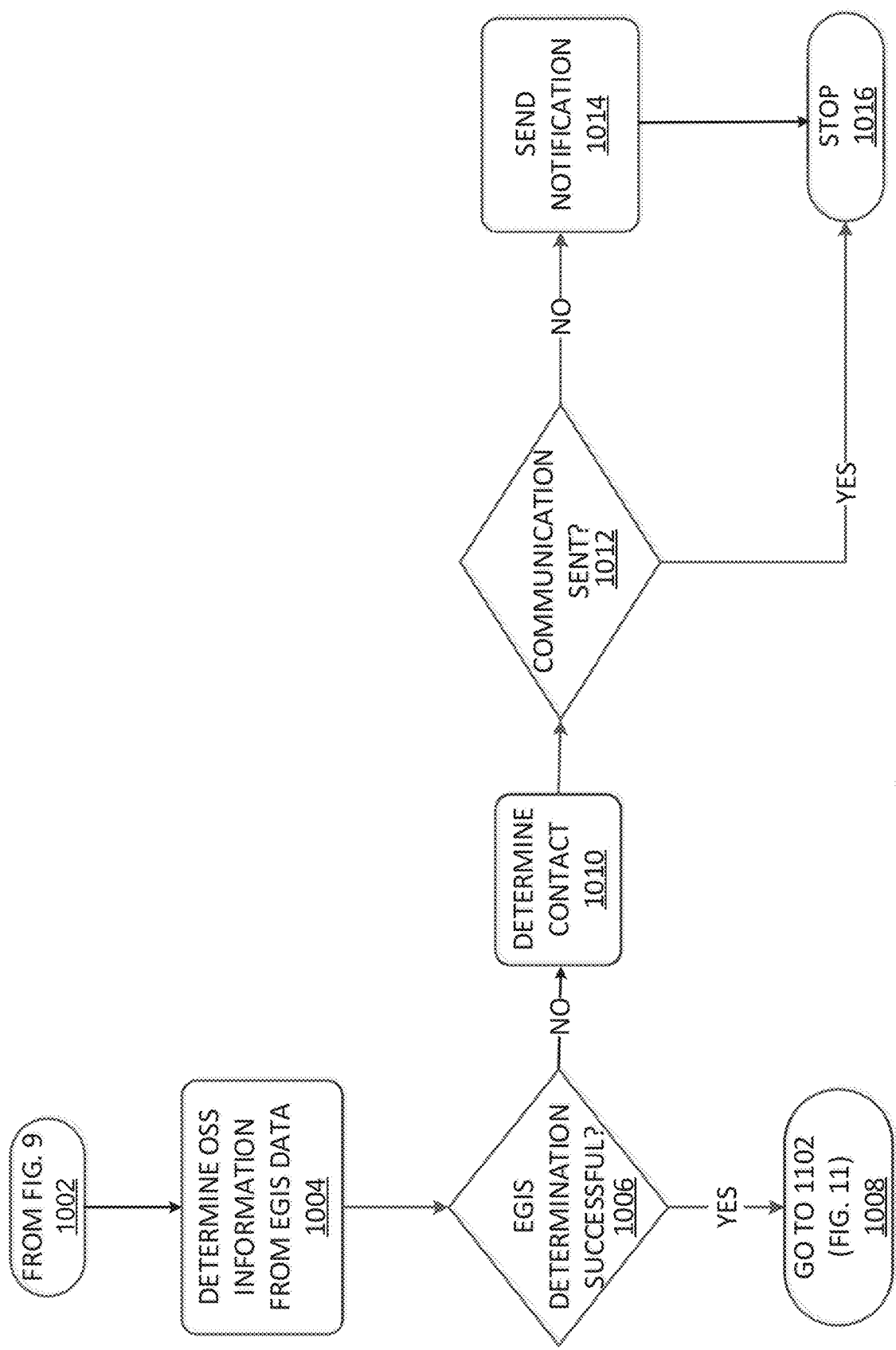
FIG. 10 illustrates a method of determining whether the Small Cell Authentication Server (SCAS) determination was successful and thereby created a security certificate for the small cell. If unsuccessful, a contact is identified and notified to facilitate successful determination of SCAS. The output of the process of FIG. 10 is used as an input to the process depicted in FIG. 11.

FIG. 10 depicts part of the workflow process that determines whether the SCAS determination was successful and thereby created a security certificate for the small cell. The output of block 908 of FIG. 9 is used as input to block 1002 of FIG. 10. Control is passed from block 1002 to block 1004, where the OSS information is determined from SCAS data. If the status of the SCAS is determined to be "SUCCESSFUL" at block 1006, control passes at block 1008 to block 1102 of FIG. 11 for the configuration file to be downloaded to OSS. Otherwise, if the status of SCAS is not determined to be "SUCCESSFUL" at block 1006, a security certificate for the small cell to be deployed should be generated. A contact to the SCAS which to send an inquiry about security certificate authentication is determined at block 1010. If communication has been determined to be sent to the contact at block 1012 regarding security certificate authentication, the workflow passes to block 1016, where the workflow stops. Otherwise, if no communication as been determined to be sent at block 1012, a notification is sent to the contact at block 1014, and the workflow stops at block 1016.

Figure 11:
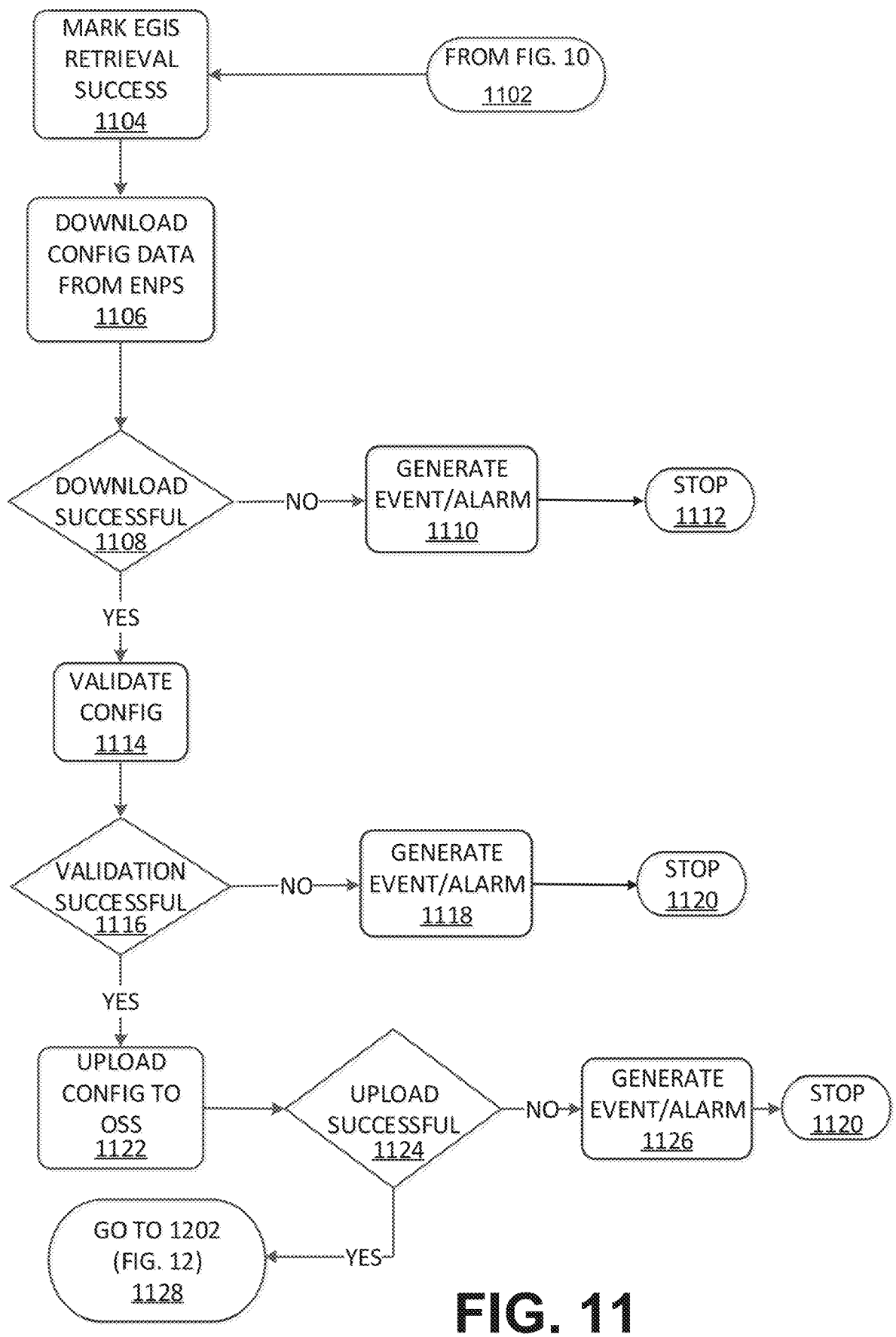
FIG. 11 illustrates a method of downloading and validating the configuration data from the ENPS. This flow diagram determines whether the downloading and validation were successful, and generates appropriate responses. The configuration is uploaded to the OSS and may be used as an input to the process depicted in FIG. 12.

FIG. 11 depicts an example workflow relating to downloading, analyzing, and uploading configuration data. The output of block 1108 of FIG. 10 is used as input to block 1102 of FIG. 11. The workflow process begins at block 1104 in which the SCAS Retrieval status is marked as "SUCCESSFUL." Control passes to block 1106 to download the configuration data from the ENPS. The status of the downloading of the configuration data is determined at block 1108. If the configuration data was not downloaded successfully at block 1108, control is passes to block 1110 to generate an event alarm. The workflow thereafter stops at block 1112.

Otherwise, if the download of the configuration data was determined to be "SUCCESSFUL" at block 1118, the configuration is validated at block 1114. In one example, the configuration is validated based on a configuration model stored in the OSS. If the configuration was not successfully validated at block 1116, control passes to block 1118 to generate an event alarm. An event alarm is an example of an error condition. The event alarm indicates that the configuration did not properly validate, and the Orchestration Platform may need to repeat the configuration generation and validation process. The event alarm status and information may be store in the asset database in one example. The workflow thereafter stops at block 1120.

If the validation was determined to be "SUCCESSFUL" at block 1116, the configuration is uploaded by the OSS at block 1122. If the uploading of the configuration is determined to be successful at block 1124, control passes to block 1128 of FIG. 11 to block 1202 of FIG. 12. If the uploading of the configuration was determined to not be "SUCCESSFUL," control passes to block 1126 to generate an event alarm, and control stops at block 1120.

Figure 12:
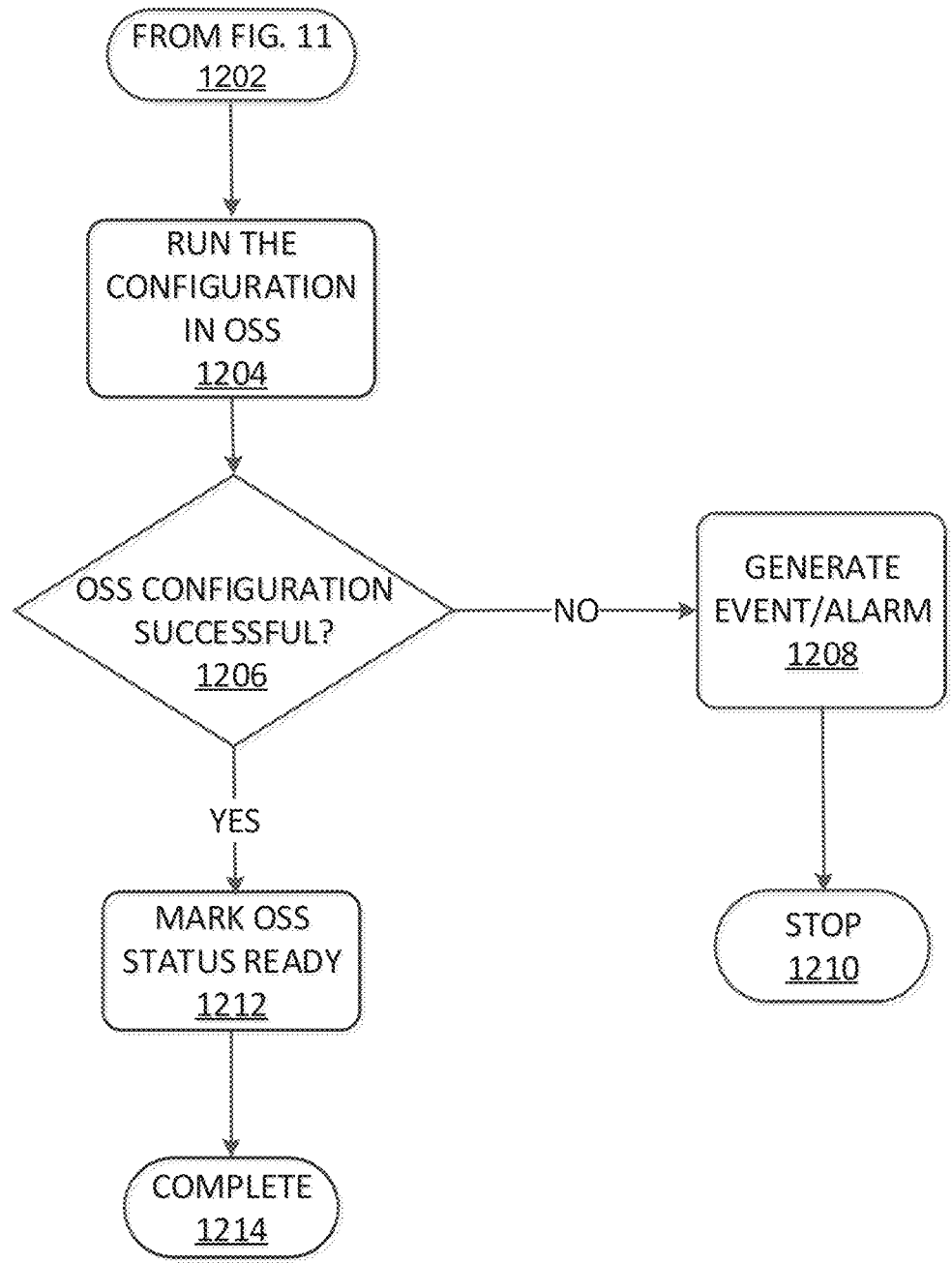
FIG. 12 illustrates a method of executing the configuration in the OSS and determining whether the configuration was successful. The flow diagram determines appropriate responses. Following successful configuration, the status of the OSS is marked as ready.

FIG. 12 depicts an example workflow showing the execution of the configuration. The output of block 1128 of FIG. 11 is used as input to block 1202 of FIG. 12. Control passes to block 1204 where the configuration is executed in the OSS. If the execution of the configuration in the OSS was determined to be successful at block 1206, the OSS status is marked as "READY" at block 1212. Control passes to block 1214 where the workflow is complete. If the OSS configuration was determined to be not successful at block 1206, control passes to block 1208 to generate an event alarm. Control then passes to block 1210 where the workflow stops.

FIG. 13 illustrates another example of configuring small cells, including microcells, picocells, and femtocells for deployment in a network. The flow diagram shown in FIG. 13 begins with creating a site instance in the asset database at block 1302. The site instance may be associated with at least one or more small cells to be deployed in the network. In an example, the site instance includes an identification field that identifies the site instance. The identification field identifies one or more small cells to be deployed. The site instance may also include one or more status fields. The status fields are associated with at least one or more small cells to be deployed. In one example, the site instance is stored in an asset database.

After creating a site instance, information associated with a configuration of at least one or more small cells to be deployed in the network is generated at block 1304. The information may be obtained from a CIQ file as discussed previously. The information may be obtained from a RFDS file as discussed previously. Upon the successful generation of the information associated with the one or more small cells to be deployed, at least one of the one or more status fields associated with the small cells to be deployed are updated to indicate a successful generation of the information associated with the configuration.

After generating the information (e.g., data and parameters) associated with the configuration of the one or more small cells to be deployed, the configuration file for the one or more small cells to be deployed is generated at block 1306. Upon successful generation of the configuration, one or more status fields associated with the small cells to be deployed are updated to indicate a successful generation of the configuration file of the one or more small cells to be deployed.

After generating the configuration file of the small cells to be deployed, the configuration file is executed at block 1308. Upon successful execution of the configuration file, one or more status fields associated with the small cells to be deployed are updated to indicate a successful execution of the configuration file.

In an example, after generation, the configuration file of the small cells to be deployed may be verified as an extra step to ensure the accuracy of the method. In an example, after execution of the configuration file, the configuration file may be downloaded to the small cell for dispatch of the small cell into the network.

The systems and methods for configuring and deployment network assets may be implemented in various embodiments. For example, the Orchestration Platform may be implemented as a virtual machine in a server computer. The Orchestration Platform may be implemented in a client computer. The Orchestration Platform may be implemented in a cloud computing environment. The Orchestration Platform may be implemented in a stand-alone computer. The Orchestration Platform may be implemented in a distributed computing environment.

Similarly, the other components of the system such as the RFDS tool 116, the ACIQ tool 114, the ENPS 112, the OSS 118, the Central Database 120, the web logic 122, and the SCAS 124 may be implemented in a server computer, in a client computer, in a cloud computing environment, in a stand-alone computer, in a distributed computing environment, and combinations thereof.

In an example, the systems and methods of this disclosure may be implemented in a cloud environment. In an example, the systems and methods of this disclosure may be implemented in a non-cloud computing environment. In an example, the systems and methods may be implemented in a hybrid environment, in which some aspects of the network deployment workflow occur in the cloud and other aspects occur in a non-cloud environment.

The disclosed systems and methods provide numerous advantages for configuring and deploying network assets such as small cells. For example, the methods and systems may be used to automatically configure, verify, and deploy small cells. The workflow includes checks and alarms allowing the system to automatically maintain its state for and properly configure small cells for deployment. The systems and methods may reduce or eliminate user interaction, facilitating standardized deployment and reduction or elimination of errors. Communication between devices and users may be optimized during deployment. Furthermore, the workflow may be interrupted or halted before complete deployment, allowing the deployment to restart at the point the workflow was interrupted without duplicating performance of the steps of the workflow process. The reduction in time and labor reduces cost and decreases the time for deployment. Moreover, automating the configuration and verification workflow permits other employees to address network issues and planned dispatch operations. The systems and methods are not limited to the automatic configuration and deployment of small cells. For example, the systems and methods may also be applied to the automatic configuration of newly added Radio Access Network (RAN) nodes.

The deployment of networks in the future, including 5G networks may include many small cell networks to increase capacity and bandwidth. One of the features of these 5G networks is expected to be the deployment of a large density of small cells. The disclosed systems and methods may be applied to any small cell network, including small cells in a 5G network. The advantages conferred by the systems and methods of this disclosure are expected to facilitate the proliferation of small cells in these future networks.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method for configuring one or more small cells for deployment in a network, the method comprising:
    creating a site instance in an asset database, the site instance associated with the one or more small cells to be deployed in the network, the site instance including an identification field and one or more status fields, the identification field identifying the one or more small cells to be deployed, the one or more status fields are associated with the one or more small cells;
    generating information associated with a configuration of the one or more small cells to be deployed in the network, wherein a subset of status fields of the one or more status fields associated with the one or more small cells to be deployed are updated to indicate a successful generation of the information associated with the configuration;
    generating a configuration file for the one or more small cells, wherein the subset of the status fields associated with the one or more small cells to be deployed are updated to indicate a successful generation of the configuration file for the one or more small cells; and
    executing the configuration file, wherein at least one of the subset of the status fields associated with the one or more small cells to be deployed are updated to indicate a successful execution of the configuration file.

2. The method of claim 1, further comprising:
    receiving information associated with the one or more small cells to be deployed; and
    determining that an identity of the one or more small cells is not associated with any site instance associated with the one or more small cells in the asset database.

3. The method of claim 1, wherein the one or more small cells is a microcell, a picocell, or a femtocell.

4. The method of claim 1, wherein generating information associated with a configuration of the one or more small cells to be deployed in the network includes generating a Customer Information Questionnaire (CIQ) or a Radio Frequency Design Sheet (RFDS).

5. The method of claim 1, generating a configuration is performed by an eNodeB server or a gNodeB server.

6. The method of claim 1, further comprising:
    deploying the one or more small cells in the network.

7. The method of claim 1, wherein the asset database includes information associated with an alarm or error condition.

8. The method of claim 1, wherein generating information associated with the configuration occurs after an acceptable transport status of the network is determined.

9. A system for configuring one or more small cells for deployment in a network, the system comprising:
    one or more processors; and
    a memory storing instructions that, when executed, cause the one or more processors to:
        create a site instance in an asset database, the site instance associated with a small cell of the one or more small cells to be deployed in the network, the site instance including an identification field and one or more status fields, the identification field identifying the small cell to be deployed, the one or more status fields are associated with the small cell;
        generate information associated with a configuration of the small cell to be deployed in the network, wherein at least one of the one or more status fields associated with the small cell to be deployed are updated to indicate a successful generation of the information associated with the configuration;
        generate a configuration file for the small cell, wherein at least one of the one or more status fields associated with the small cell to be deployed are updated to indicate a successful generation of the configuration file for the small cell; and
        execute the configuration file, wherein at least one of the one or more status fields associated with the small cell to be deployed are updated to indicate a successful execution of the configuration file.

10. The system of claim 9, wherein the asset database includes information associated with an alarm or error condition.

11. The system of claim 9, wherein generating information associated with a configuration occurs after an acceptable transport status of the network is determined.

12. The system of claim 9, further comprising validating the configuration file.

13. The system of claim 9, wherein the one or most status fields are associated with a Customer Information Questionnaire (CIQ), a Radio Frequency Design Sheet (RFDS), an eNodeB, a gNodeB, a security authorization server, or an Operational Support System (OSS).

14. The system of claim 9, wherein generating information associated with a configuration of the small cell to be deployed in the network further comprises determining that at least one of the one or more status fields associated with the small cell to be deployed does not indicate a successful generation of the information associated with the configuration.

15. The system of claim 9, wherein generating a configuration file for the small cell further comprises determining that at least one of the one or more status fields associated with the small cell to be deployed does not indicate a successful generation of the configuration file for the small cell.

16. The system of claim 9, wherein executing the configuration file further comprises determining that at least one of the one or more status fields associated with the small cell to be deployed does not indicate a successful execution of the configuration file.

17. The system of claim 9, further comprising executing the configuration file.

18. The system of claim 9, wherein the small cell is a microcell, a picocell, or a femtocell.

19. The system of claim 9, wherein generating information associated with a configuration of the small cell to be deployed in the network includes directing generation of a Customer Information Questionnaire (CIQ) or a Radio Frequency Design Sheet (REDS).

20. The system of claim 9, generating a configuration includes directing an eNodeB server or a gNodeB server to create the configuration.

* * * * *